(12) United States Patent
Neyrou et al.

(10) Patent No.: US 10,497,195 B2
(45) Date of Patent: Dec. 3, 2019

(54) RADIOFREQUENCY IDENTIFICATION DEVICE IN THE FORM OF A RING PROVIDED WITH A SYSTEM FOR DETERIORATING PERSONAL DATA IN THE EVENT OF LOSS OR THEFT

(71) Applicant: ICARE TECHNOLOGIES, Ajaccio (FR)

(72) Inventors: Jérémy Neyrou, Péri (FR); Fabien Raiola, Porto-Vecchio (FR)

(73) Assignee: ICARE TECHNOLOGIES, Ajaccio (FR)

( * ) Notice: Subject to any disclaimer, the term of this patent is extended or adjusted under 35 U.S.C. 154(b) by 0 days.

(21) Appl. No.: 16/074,772

(22) PCT Filed: Feb. 2, 2017

(86) PCT No.: PCT/EP2017/052276
§ 371 (c)(1),
(2) Date: Aug. 2, 2018

(87) PCT Pub. No.: WO2017/134174
PCT Pub. Date: Aug. 10, 2017

(65) Prior Publication Data
US 2019/0043284 A1    Feb. 7, 2019

(30) Foreign Application Priority Data
Feb. 3, 2016  (FR) ..................... 16 50866

(51) Int. Cl.
*G07C 9/00*  (2006.01)
*G06K 19/04*  (2006.01)
(Continued)

(52) U.S. Cl.
CPC .......... *G07C 9/00111* (2013.01); *G06K 19/04* (2013.01); *G06K 19/07345* (2013.01);
(Continued)

(58) Field of Classification Search
CPC ............ G06K 19/04; G06K 19/07309; G06K 19/07345; G06K 19/07762;
(Continued)

(56) References Cited

U.S. PATENT DOCUMENTS

| | | | | |
|---|---|---|---|---|
| 3,919,596 A | * | 11/1975 | Bellis | ................... H03K 17/725 315/294 |
| 2008/0171915 A1 | * | 7/2008 | Kawajiri | ............ A61B 5/02241 600/300 |
| 2011/0271053 A1 | | 11/2011 | Schroeter et al. | |
| 2012/0036758 A1 | * | 2/2012 | Steffens | ................. A01K 77/00 43/12 |
| 2012/0152310 A1 | * | 6/2012 | Hinman | ................ G01S 3/7861 136/246 |

(Continued)

FOREIGN PATENT DOCUMENTS

FR    3 036 213 A1    11/2016

*Primary Examiner* — Yong Hang Jiang
(74) *Attorney, Agent, or Firm* — Im IP Law; C. Andrew Im; Chai Im

(57) ABSTRACT

An identification device includes a ring incorporating at least one radiofrequency transponder which includes a microcontroller. The microcontroller includes at least one memory having data storage areas and at least one antenna configured to emit an electromagnetic field carrying identification information. The identification device further includes at least one photosensitive element positioned on an inner face of the ring. The photosensitive element is configured to generate a current when the photosensitive element is illuminated, in order to cause a deterioration of the memory area storing the data.

12 Claims, 7 Drawing Sheets

(51) Int. Cl.
  *G06K 19/073* (2006.01)
  *G06K 19/077* (2006.01)

(52) U.S. Cl.
  CPC ............ *G06K 19/07762* (2013.01); *G07C 2009/00595* (2013.01); *G07C 2009/00769* (2013.01); *G07C 2009/00968* (2013.01)

(58) Field of Classification Search
  CPC ...... G06K 7/10079; G07C 2009/00595; G07C 2009/00753; G07C 2009/00769; G07C 2009/00793; G07C 2009/00968; G07C 9/00111; G06Q 10/08
  USPC ............................ 340/5.6, 5.61, 5.64, 5.65
  See application file for complete search history.

(56) References Cited

U.S. PATENT DOCUMENTS

| | | | |
|---|---|---|---|
| 2012/0229487 A1* | 9/2012 | Samanta | G09G 5/00 345/582 |
| 2015/0028996 A1* | 1/2015 | Agrafioti | G06F 21/40 340/5.82 |
| 2015/0178532 A1* | 6/2015 | Brule | G06K 19/0717 340/5.61 |
| 2015/0220109 A1 | 8/2015 | Von Badinski et al. | |
| 2016/0156603 A1* | 6/2016 | Janik | H04L 63/0492 726/7 |
| 2016/0334110 A1* | 11/2016 | Neuhauser | H03K 17/962 |
| 2017/0020191 A1* | 1/2017 | Lamb | A24F 47/008 |
| 2018/0089478 A1 | 3/2018 | Neyrou et al. | |

* cited by examiner

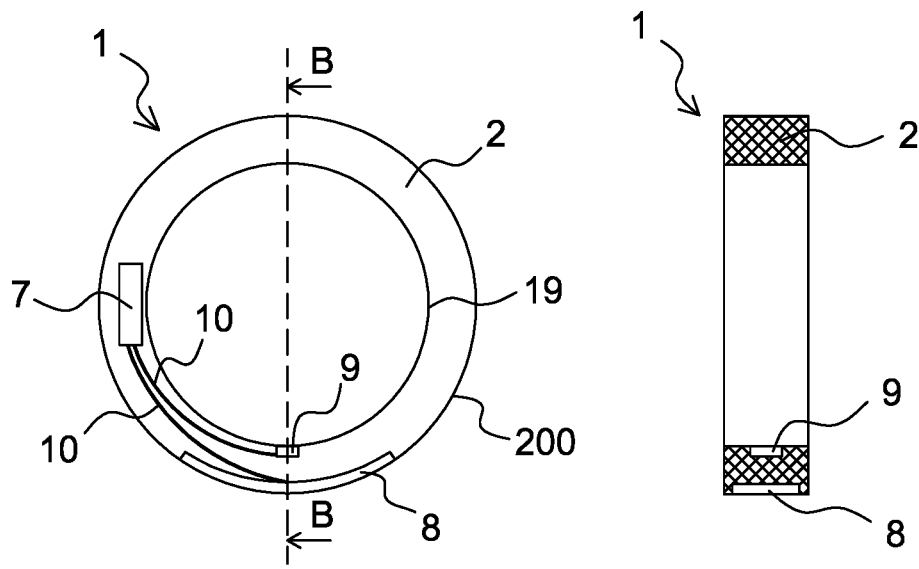
Fig.3a   Fig.3b
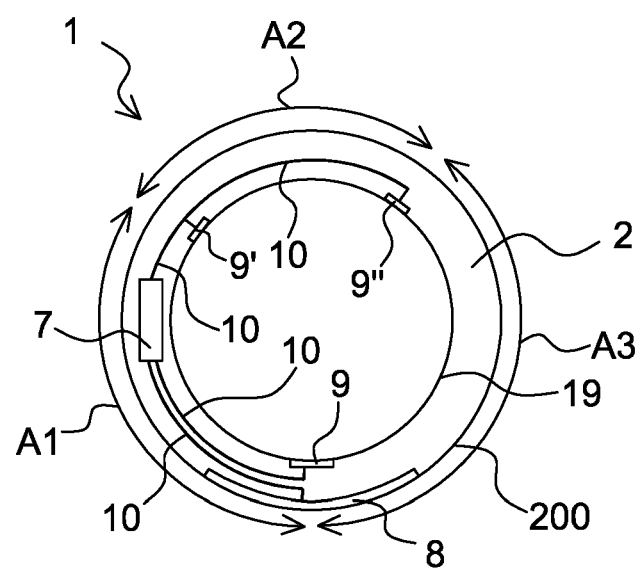
Fig.4

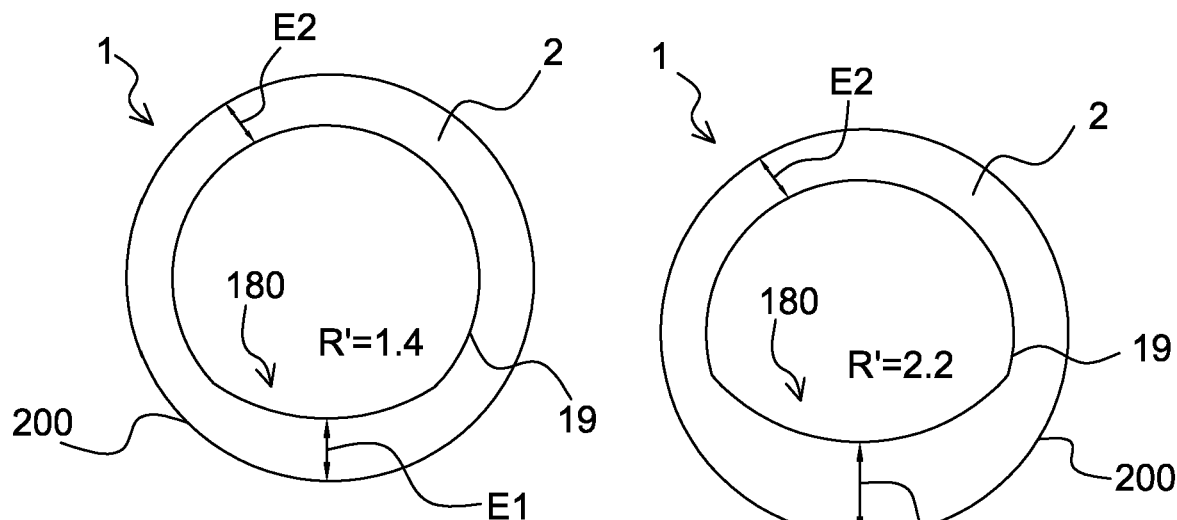
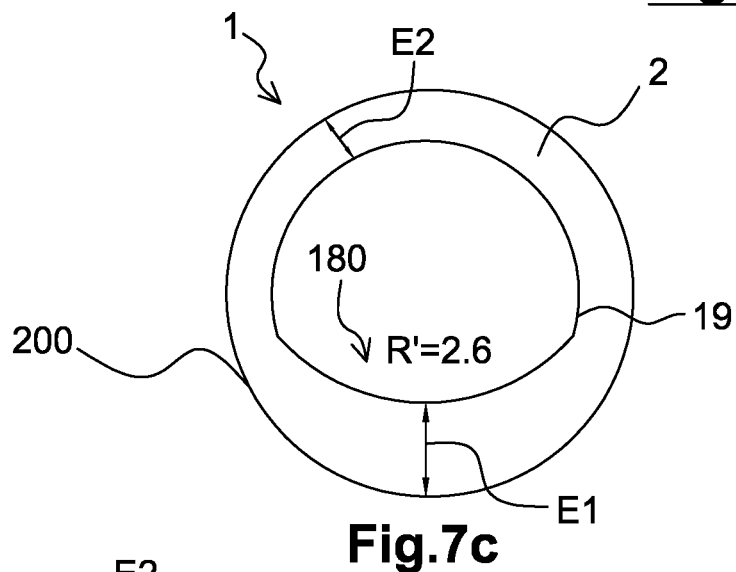
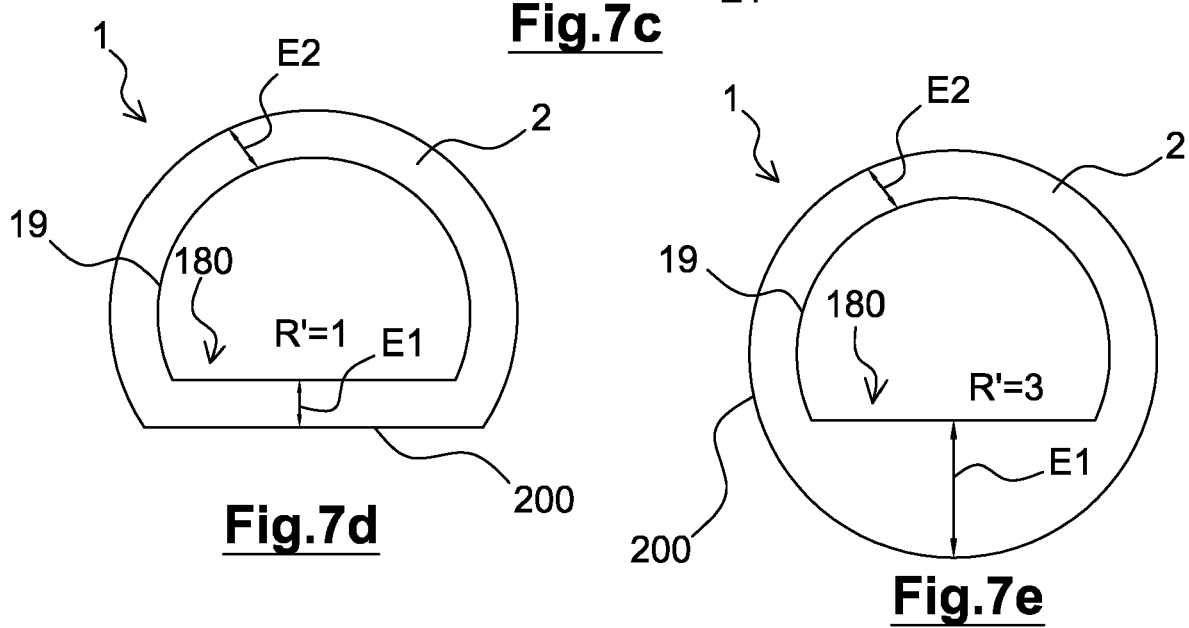

RADIOFREQUENCY IDENTIFICATION DEVICE IN THE FORM OF A RING PROVIDED WITH A SYSTEM FOR DETERIORATING PERSONAL DATA IN THE EVENT OF LOSS OR THEFT

RELATED APPLICATIONS

This application is a § 371 application from PCT/EP2017/052276 filed Feb. 2, 2017, which claims priority from French Patent Application No. 16 50866 filed Feb. 3, 2016, each of which is incorporated herein by reference in its entirety.

FIELD OF THE INVENTION

The invention relates to an identification device provided with a radio-frequency transponder, for example of the RFID (or "Radio-Frequency Identification") type and/or the NFC (or "Near Field Communication") type in the shape of a ring.

The invention can be implemented in all areas requiring an identification, or a password, to unlock the operation of a system, to secure access controls such as, but not limited to, automobile, home automation, for example for opening doors, IT, and the field of banking transactions.

BACKGROUND OF THE INVENTION

The applicant has developed an identification device comprising a passive radio-frequency transponder integrated into a ring that can be worn every day, such as a finger ring. This passive device described in document FR1554360 is able to emit information, notably identification information, when an antenna emits electromagnetic waves within range. For this purpose, the device comprises a memory storing certain personal information of the user. However, in the event that the device is stolen or lost, another person could usurp the use, which leads to a risk of a diversion of the object and therefore a lack of security.

OBJECT AND SUMMARY OF THE INVENTION

The invention aims to effectively remedy this drawback by proposing an identification device comprising a ring integrating at least one radio-frequency transponder comprising a microcontroller provided with at least one memory comprising areas storing data and at least one antenna for emitting an electromagnetic field carrying identification data, characterized in that said identification device further comprises at least one photosensitive element positioned on an inner face of said ring, said photosensitive element being able to generate or to authorize the delivery of a current when said photosensitive element is illuminated to cause a deterioration of said data.

The deterioration of the data may consist for example of a total or partial erasure of these data in the memory areas corresponding or in a total or partial encryption or ciphering of these data by a suitable mathematical algorithm. So, the information can be encrypted using for example a symmetric encryption algorithm of AES ("Advanced Encryption Standard") 256 bits type.

Thus, the configuration is such that, when said ring is worn around a finger of a user, said photosensitive element is at least partially masked and does not produce a current sufficient for modifying said memory zones storing personal data, and when said ring is removed from the finger of the user, said photosensitive element receives natural or artificial light so as to produce a corresponding current for generating a logic state causing a deterioration of at least a portion of said memory areas storing said personal data.

The invention thus improves the security of the identification device while guaranteeing the erasure of data, confidential or not, sensitive or not, stored in the transponder memory when removing the ring from the finger of the carrier.

According to one embodiment, said photosensitive element is formed by a photovoltaic cell.

According to one embodiment, said photosensitive element is covered with a layer of translucent protective varnish. The translucency of the varnish is an important selection criterion for adjusting the sensitivity threshold of the cell, so that the data are erased with the slightest movement of the cell away from the user's finger.

According to one embodiment, said device comprises a plurality of photovoltaic cells. Such a feature avoids an inadvertent erasure of the data, insofar as the erasure of the data does not occur if all the cells produce enough electricity.

According to one embodiment, said photovoltaic cells are angularly spaced apart in a regular manner around said ring. This enables to optimize the distribution of the cells.

According to one embodiment, said photosensitive element is associated with an electronic circuit comprising at least one resistor for setting a triggering threshold for a change of state of said photosensitive element and a capacitor for setting a duration before triggering said change of state.

According to one embodiment, said photosensitive element is connected to an electronic switch capable of causing the erasure or encryption of said data when said electronic switch is powered by said photosensitive element.

According to one embodiment, said ring comprises at least one anti-rotation means for locking the rotation of said ring around the finger of the user. It enables to index the rotation the device around the finger for ensuring a correct positioning of the antenna relative to a corresponding target (such as a reader).

In one embodiment, said anti-rotation means is formed by a flat part or an ovoid shape formed in said inner face of said ring.

In one embodiment, a ratio between the largest thickness of a ring portion comparison the flat part or ovoid shape and the thickness of a portion ring without any flat part or ovoid shape is between 1 and 5.

According to one embodiment, the data contained in the memory in said microcontroller are encrypted.

According to one embodiment, said photosensitive element does not provide enough power to erase the data or to power the microcontroller that will perform this operation. It is therefore necessary to add an energy recovery system.

The energy recovery system recovers energy which can then be transformed and stored by this or another system. In this case, the photosensitive elements inside the ring are only used as a trigger for erasing the data. The erasure is then performed directly or indirectly by the energy stored in the identification device.

There is a multitude of energy recovery systems that can be used with the invention. The recovery system may be able to directly or indirectly transform thermal or light energy into electric energy. In the case of the recovery of light energy, the cells need to be responsive enough to quickly produce electric energy. According to one particular embodiment, these cells are tailor-made for the ring. In one exemplary embodiment, they do not exceed 1 mm thick and can be flexible.

Advantageously, a photovoltaic cell is used, which is responsive to both solar radiation and a wide variety of artificial light radiation. The cell can advantageously have a maximum spectral sensitivity about the wavelength of 580 nm and a wider sensitivity spectrum than that of the human eye.

According to one particular embodiment, the energy recovery system can also be a mechanical system which, when in motion, can produce directly or indirectly an electric current. According to another embodiment of this mechanical device, a "small wheel" rubs against the finger when removing the ring and then produces electricity.

According to on particular embodiment, the energy recovery system can also be formed by an antenna. It then recovers the electromagnetic energy from electromagnetic fields surrounding it, so as to produce an electric energy. These fields may depend on NFC frequencies as other frequencies such as Wi-Fi or radiotelephone frequencies.

According to one particular embodiment, the energy recovery system can also be able to recover static electricity from the human body by means electrodes in contact with the skin of the wearer. By holding a (very) negatively or (very) positively charged material, a difference in electrical potential will then be observed between the material and the body wearing the ring. This electricity produced can be used directly or indirectly for erasing data. In this case, it is stored in an energy storage system.

According to one particular embodiment, the energy recovery system can also be a system based on a nano-generator, using a superposition of different flexible piezo-electric materials (e.g. polyvinylidene fluoride (PVDF), rigid plastic that can also be treated with zinc oxide).

This piezoelectric device has the ability to bend while generating electricity when subjected to vibrations, even weak vibrations. This recovery system can be integrated into the inside or outside of the ring so to generate electricity when significant friction occurs between the ring and the finger or, when integrated on the external part, to generate electricity with the different mechanical contacts impacts that the ring will undergo during a daily use.

The energy storage system can be formed by one or a plurality of capacitors. For example and in a non-exhaustive way, the type of capacitor can be based on aluminum foil, metalized paper, Mica, unpolarized electrochemical ceramic, polarized electrochemical ceramic and more specifically tantalums. The selected capacitor can be of variable type.

According to another embodiment, the storage device is formed by one or more batteries located in the periphery of the ring. These batteries can have a circular shape so that they can be easily integrated into the ring. They can be flexible, semi-flexible, hard or locally foldable.

For certain batteries or capacitors, it is necessary to leave more room in the ring so that during the swelling during to the loading process (which can be up to 10% of the volume) the ring or the battery is not deteriorated.

In one particular embodiment, the ring can be placed in a secure module associated with an NFC controller that enables to use the ring in the banking sector, for example for authorizing transactions.

A user interface, such as a diode, can also be inserted into the ring so as to inform the user that the memory is erased or not.

BRIEF DESCRIPTION OF THE DRAWINGS

The invention will be better understood from the following description and the annexed figures. These figures are given only as an illustration, and by no means a limitation, of the invention.

FIGS. 3A and 3B are respectively side and sectional views in the plane B-B illustrating a variant embodiment of the identification device according to the invention;

FIG. 4 is a front view of an identification device according to the invention integrating several photovoltaic cells;

FIGS. 7A to 7E illustrate possible variant embodiments of the indexing device having an internal ovoid shape or a flat part;

Identical, similar or analogous elements have the same reference throughout the figures. In addition, in the following description, relative positioning terms such as "up", "down", "left" and "right" are understood by reference to the meaning given to these terms by a user wearing the ring, the hand being extended with the palm towards the floor of a room.

DETAILED DESCRIPTION OF THE EMBODIMENTS

Figure 1A:
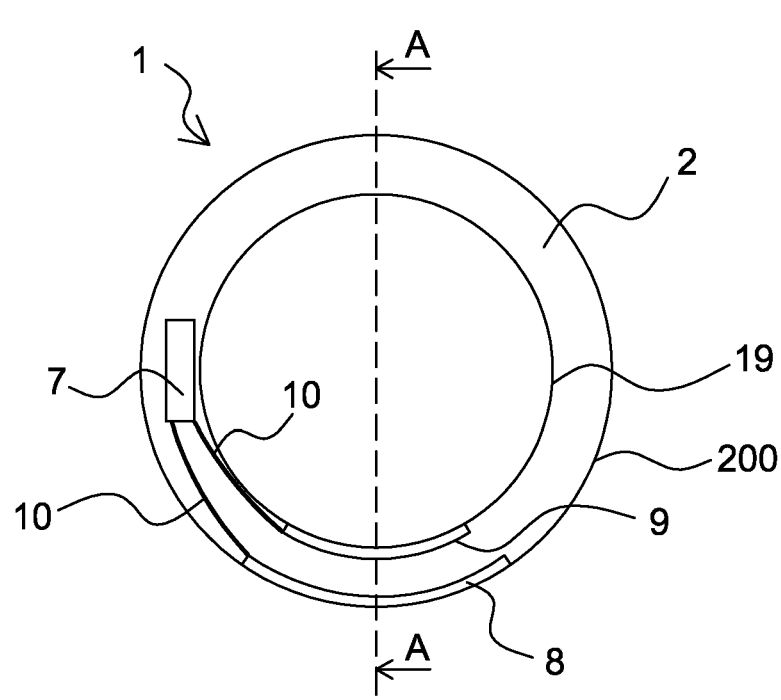
FIGS. 1A and 1B are respectively side and sectional views in the plane A-A of an identification device according to the invention equipped with a system for deteriorating personal data according to the present invention.
Figure 1B:
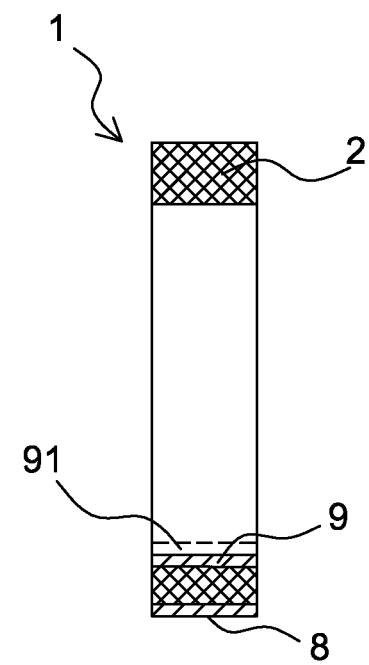
Figure 8:
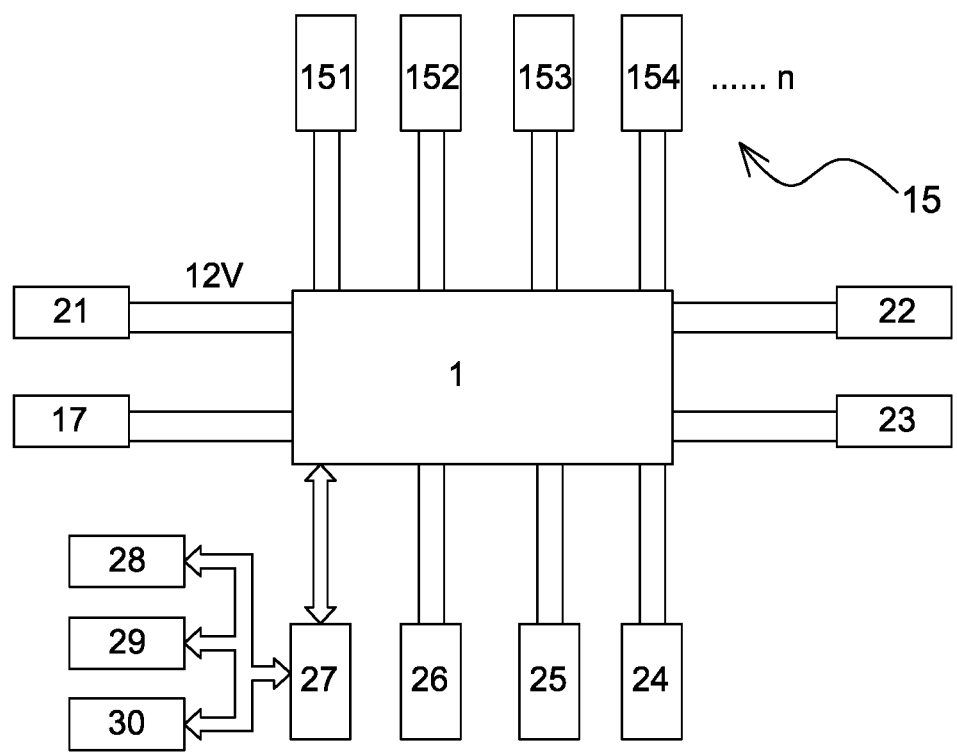
FIG. 8 is a block diagram of the various interactions of the identification device according to the present invention with elements in its environment as in an automobile application.
Figure 9A:
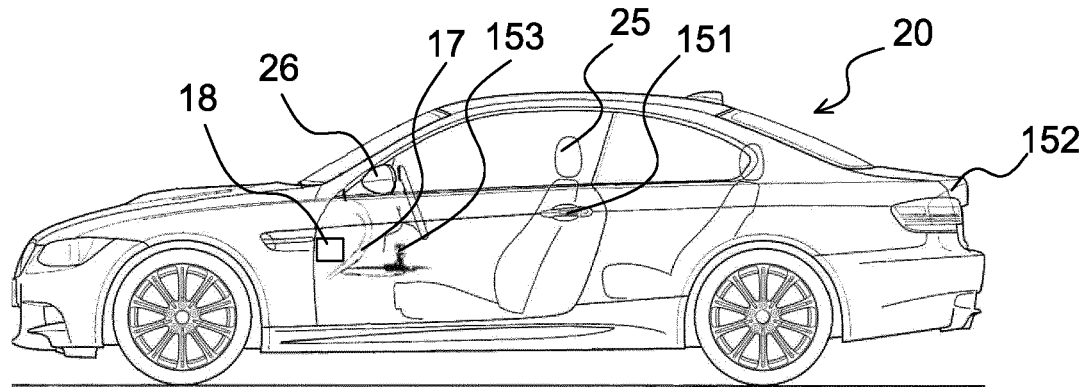
FIGS. 9A to 9D are respectively side, top, back and front views of a vehicle equipped with a radio reader for interacting with the identification device according to the present invention.
Figure 9B:
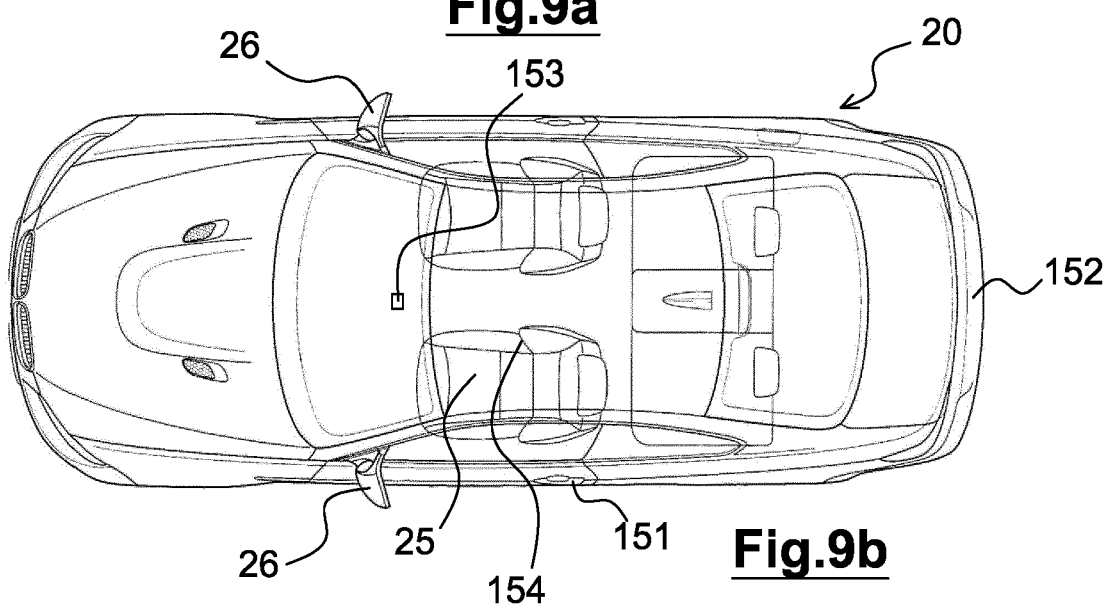
Figure 9C:
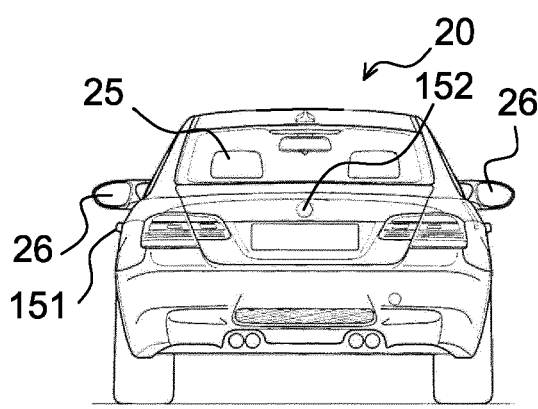
Figure 9D:
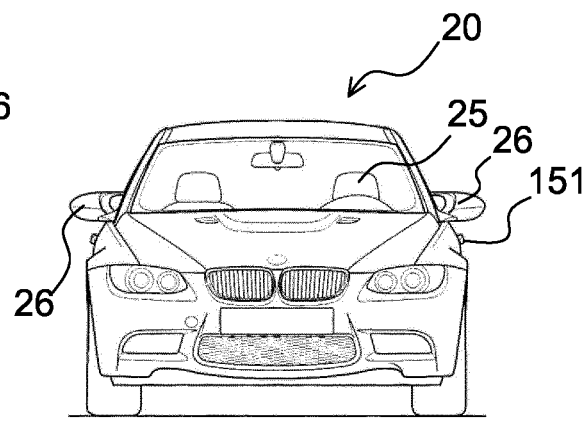

FIGS. 1A and 1B show an identification device 1 comprising a ring-shaped body 2 with an axis X incorporating a radio-frequency transponder 3 comprising a microcontroller (or chip 7) and an antenna 8 capable of emitting an electromagnetic field carrying identification data for communicating with a corresponding radio reader 15 (see FIG. 8). The transponder 3 is for example of the NFC or RFID type or can be any other autonomous remote communication transponder without any integrated power supply. Alternatively, several transponders 3 can be integrated into the annular body 2 so as to be identified by different types of radio readers 15.

The device 1 can be tightly sealed (or not), impermeable (or not), insensitive to granules, dust (or not) or any other substance/material that can generate an electromagnetic mask, or a deterioration of the assembly.

Figure 2:
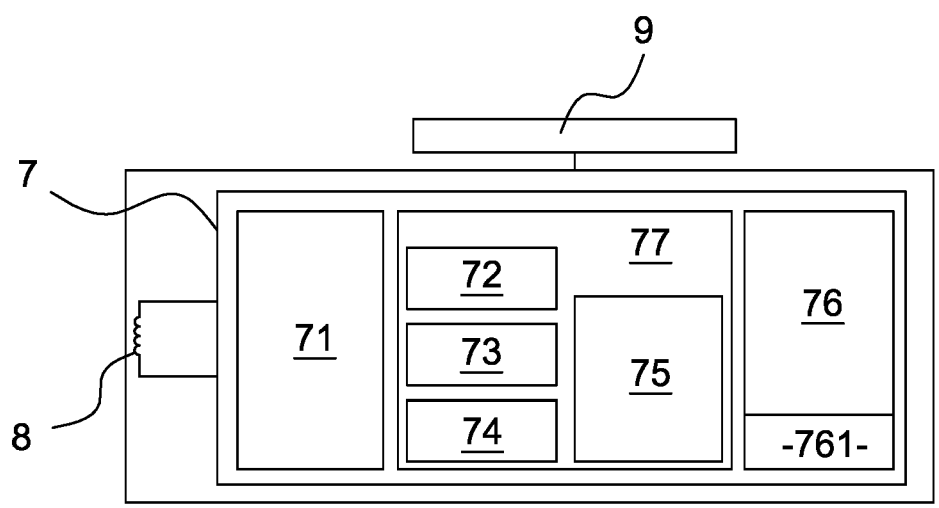
FIG. 2 is a block diagram of the microcontroller integrated in the device according to the present invention.

More precisely, as illustrated in FIG. 2, the microcontroller 7, for example of the "MFOICU2" type of the company NXP Semiconductors comprises a radio-frequency interface 71 composed of a modulator/demodulator, a rectifier, a clock regenerator and a voltage regulator. The microcontroller 7 also includes cryptographic processors 72 for data for example with triple encryption and a cryptographic control unit 73 associated for controlling the operations of the cryptographic processors.

A command interpreter 74 makes it possible to manage the commands for access the memory interface 75 in communication with a memory 76. The memory 76 is a read-only memory. As an example and in a non-restrictive way, it can be of ROM, EPROM, EEPROM, or SSD type. The set of elements 72, 73, 74, 75 is controlled by the digital control unit 77.

In one exemplary embodiment, the memory 76 has 1536 bits organized in 48 pages with 32 bits each. 80 bits are reserved for the data of the manufacturer. 32 bits are used for the read-only locking mechanism. The 32 bits on pages 4 to 39 correspond to areas 761 storing personal data of a user. The areas of the memory 76 are considered as written in the logical state "1" and empty in the logic state "0". The information contained in the memory 76 can be encrypted by using for example a symmetric encryption algorithm of AES (for "Advanced Encrypt ion Standard") 256 bits type.

When the device 1 is positioned near the reader 15, the high-speed radio-frequency communication interface 71 enables the transmission of data at a speed of 106 kbit/s. Energy and data are transferred through the antenna 8 formed for example by a coil having some turns directly connected to the microcontroller 7. No other external component is necessary. As a variant, components of the diode, coil, and capacitor type could be used to process the signal before reception by the microcontroller 7.

The identification device 1 further comprises at least one photosensitive element 9 capable of generating a current when said element 9 is illuminated. As can be seen in FIGS. 1A, 1B, 3A and 3B, the photosensitive element 9 is positioned on an inner face 19 of the ring 2. The photosensitive element 9 is preferably a photovoltaic cell. In a variant, the photovoltaic cell 9 can be replaced with a phototransistor, a photoresistor, or more generally any optoelectronic component capable of generating an electric current.

The photovoltaic cell 9 can be integrated in different ways into the ring 2. Thus, the cell 9 can be fixed on the surface, for example by gluing, or molded into the ring 2. In this case, a window is provided in the ring next to the cell 9.

It is advantageous to use a photovoltaic cell 9 that is sensitive to both solar radiation and a wide variety of artificial light radiations. In one exemplary embodiment, the cell 9 has a maximum spectral sensitivity at the wavelength of 580 nm and a wider sensitivity spectrum than that of the human eye.

The photovoltaic cell 9 may be of different types, for example and in a non-limiting manner, the photovoltaic cell 9 used is made of monocrystalline, multi-crystalline (or polycrystalline) silicon, amorphous silicon, tandem, in CGIS ("Copper, Indium, Gallium, and Selenium"), cadmium telluride, and is of organic and/or multi junction type.

All of these components are interconnected via wired connections 10 or a printed circuit board of the PCB ("Printed Circuit Board") type.

The operation of the device 1 according to the present invention is described below. When the ring 2 is worn around a user's finger, the photovoltaic cell 9 is at least partially masked by the finger and does not produce a current sufficient to modify the memory areas 761 storing personal data of the user.

When the ring 2 is removed from the user's finger, the photovoltaic cell 9 receives a light that can be either a natural light or an artificial light and produces a corresponding current, so as to generate a state logic causing deterioration of at least a part of the memory areas 761 storing the personal data of the user. The deterioration of the personal data of the user may consist for example of a total or partial erasure of these data in the corresponding memory areas or of a total or partial encryption of these data by an appropriate mathematical algorithm. So, the data can be encrypted by using for example a symmetric encryption algorithm of the AES ("Advanced Encryption Standard") 256 bits type.

In the event of an erasure, and according to the type of the microprocessor(s) used and their corresponding operating standards, the current must impose a logical state "1" or "0" on all the memory zones 761 containing the personal data of the user. With the above-mentioned microcontroller MFOICU2, the exposure of the photovoltaic cell 9 to the light will result in setting the memory zones 761 containing the data of the user to the logical state "0". Pages 4 to 39 can thus be deleted.

The photovoltaic cell 9 can be indirectly responsible for the erasure of the data. For example, when the cell 9 is illuminated, the cell 9 controls the delivery of a current from another source of energy integrated in the ring 2, for example one or more photovoltaic cells 9 on the outer periphery of ring 2.

Figure 10:
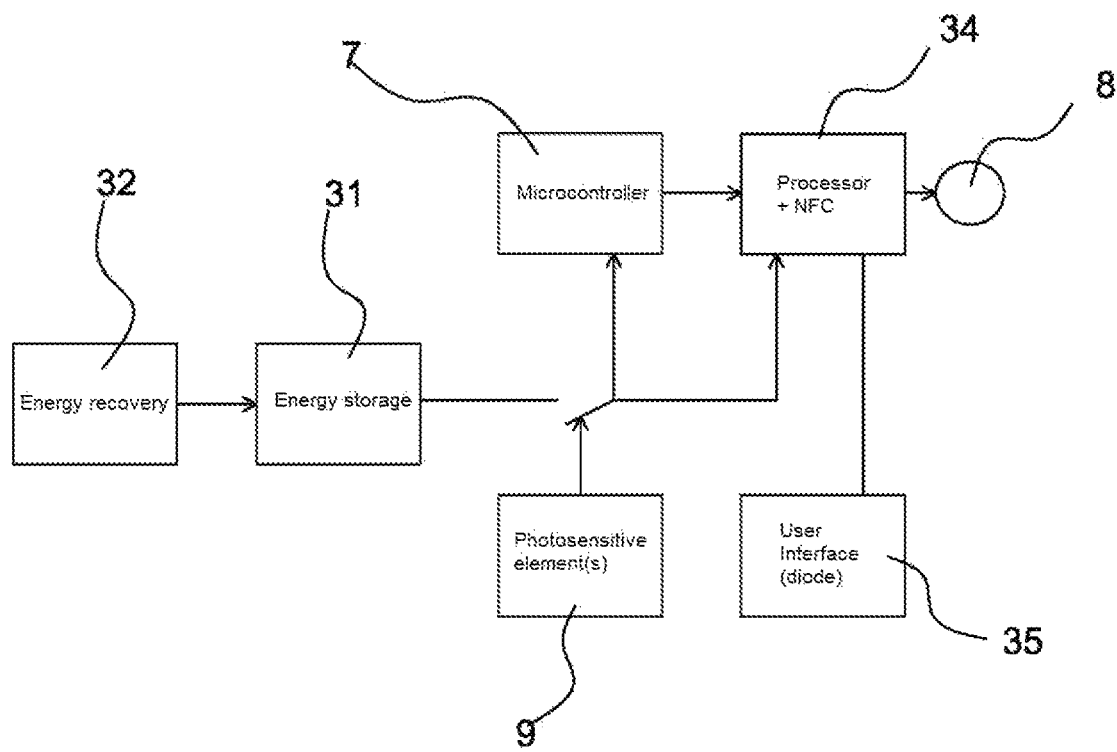
FIG. 10 is a block diagram of a preferential embodiment of the identification device according to the invention.

In some cases, the photosensitive element 9 does not provide enough current for erasing the data or to power the microcontroller 7 performing this operation. As shown in FIG. 10, the photosensitive elements 9 provide a triggering function causing an energy storage system 31 to power the microcontroller 7 performing directly or indirectly the erasure, complete or not, of the data in the memory zones 761. When the photosensitive element 9 is illuminated, it can for example cause the closure of an associated switch establishing an electrical connection between the storage system 31 and the microcontroller 7 so as to power this latter and erase the data. The energy stored in the system 31 comes from an energy recovery system 32.

There is a multitude of energy recovery systems 32 that can to be used with the invention. The recovery system 32 may be suitable for directly or indirectly transform thermal or light energy into electric energy. In the case of the recovery of light energy, the cells need to be reactive enough to quickly produce electric energy. According to ONE particular embodiment, these cells are tailor-made for the ring 2. The cells do not exceed 1 mm thick and can be flexible.

It is advantageous to use a photovoltaic cell that is sensitive to both solar radiation and a wide variety of light artificial radiations. The cell can advantageously have a maximum spectral sensitivity at the wavelength of 580 nm and a wider sensitivity spectrum than that of the human eye.

The energy recovery system 32 can also be formed by a mechanical system which, when in motion, can produce directly or indirectly an electric current. According to another embodiment of this mechanical device, a "small wheel" rubs against the finger when removing the ring and then produces electricity.

According to one particular embodiment, the energy recovery system 32 can also be composed of an antenna. It recovers the electromagnetic energy from electromagnetic fields surrounding it so as to produce electric energy. These fields may depend on NFC frequencies as other frequencies such as WI-FI or radiotelephone frequencies.

According to one particular embodiment, the energy recovery system 32 can also be able to recover the static electricity from the human body by means of electrodes in contact with the skin of the wearer. By holding a (very) negatively or (very) positively charged material, a difference in electrical potential will then be observed between the material and the body that carries the ring 2. The electricity produced can be used directly or indirectly for erasing data. In this case of indirect use, it is stored in the energy storage system 31.

According to one particular embodiment, the energy recovery system 32 can also be a system based on a nano-generator, using a superposition of various flexible piezoelectric materials (e.g. polyvinylidene fluoride (PVDF), rigid plastic that can also be treated with zinc oxide).

This piezoelectric device has the ability to bend while generating electricity when subjected to vibrations, even weak vibrations. This recovery system 32 can be integrated into the inside or outside of the ring 2 so to generate electricity when significant friction occurs between the ring 2 and the finger or, when integrated on the external part, to generate electricity with the different mechanical contacts impacts that the ring 2 will undergo during a daily use.

The energy storage system 31 can be formed by one or a plurality of capacitors 33. For example and in a non-exhaustive way, the type of capacitor 33 can be based on aluminum foil, metalized paper, Mica, unpolarized electrochemical ceramic, polarized electrochemical ceramic and more specifically tantalums. The selected capacitor 33 can be of variable type.

According to another embodiment, the energy storage device 31 is formed by one or more batteries located in the periphery of the ring 2. These batteries can have a circular shape so that they can be easily integrated into the ring 2. They can be flexible, semi-flexible, hard or locally foldable.

For certain batteries or capacitors 33, it is necessary to leave more room in the ring 2 so that during the swelling during to the loading process (which can be up to 10% of the volume) the ring 2 or the battery is not deteriorated.

The identification device 1 according to the invention can comprise a secure module 34 associated with an NFC controller that enables the use of the device 1 in the banking sector, in particular for secure transactions.

A user interface 35, such as a diode, can also be inserted onto the ring 2 so as to inform the user that memory zones 761 are erased or not. For example, if the user removes the ring 2 and then put it again without copying her personal data when using it later, the electroluminescent diode 35 is illuminated in one color, for example red, for informing that the device 1 is not operational. Otherwise, the diode 35 illuminates in another color, for example in white or green, to inform that the device 1 is operational. Alternatively, the photovoltaic element 9 can be associated with an electronic switch 13, shown in FIG. 5, able to cause the erasure or encryption (deterioration) of the data from the zones 761. For example, this switch 13 can be formed by a transistor. The photosensitive element 9 is associated with an electronic circuit 14 comprising preferably at least one resistor R for setting a triggering threshold of the change of state for the photosensitive element 9 and a capacitor C fort setting a duration before triggering the change of state. In all cases, the generation of the current and therefore the erasure of the data is carried out quickly in a delay preferably inferior to 100 ms.

Once the personal data has been erased, the device 1 becomes unusable due to the deletion of the identification data. To be able to reuse it, the user will have to make a copy of the data through a communicating device, such as a mobile phone or a tablet, in the memory the transponder 3. Of course, the ring 2 will be worn by the user during the operation otherwise the copying would have no effect insofar the data would be instantly delete due to the illumination of the photovoltaic cell 9.

In one particular embodiment, some user data is kept and associated with a customer account. In that case, only the original user is likely to be able to copy the missing data after deletion in the memory 76 of the transponder 3. If the application of the communicating device observes that the user account does not match the device 1 then the copy of the data is blocked by the application.

Alternatively, it is possible to reuse the erased or encrypted data by "reactivation" of the device 1 after an authentication of the user. This authentication is for example carried out by means of a dedicated device such as a biometric reader integrated into the ring 2.

Moreover, the photosensitive element 9 can be covered with a layer 91 of translucent protective varnish (see FIG. 1B). The translucency of the varnish is a selection criterion for adjusting the sensitivity threshold of the cell 9, so that the data are not erased with the slightest movement away from the cell 9 relative to the user's finger. The size of cell 9 will also be adapted according to the application for adjusting the sensitivity of the device 1. Indeed, the larger the cell 9, the more the cell 9 will capture light and thus the more the cell 9 will be sensitive. Thus, in the embodiment in FIGS. 3A and 3B, the size of the cell 9 is reduced relative to that of the cell in FIGS. 1A and 1B.

In the embodiment in FIG. 4, the device 1 comprises a plurality of photovoltaic cells 9, 9', 9". This avoids an inadvertent deletion of the personal data, insofar as the erasure of the data then occurs only if all the cells 9, 9', 9" product enough electricity. For this purpose, a logic 14 is used, which integrates a system that is or can be similar to an "AND" type logical gate and whose output is in communication with the switch 13. In order to optimize the distribution of the cells, the cells 9, 9', 9" are preferably angularly spaced from each other in a regular manner around the ring 2. Thus, the three cells 9, 9', and 9" are arranged so that the angles A1, A2, and A3 between two consecutive cells are equal to 120 degrees.

Figure 6:
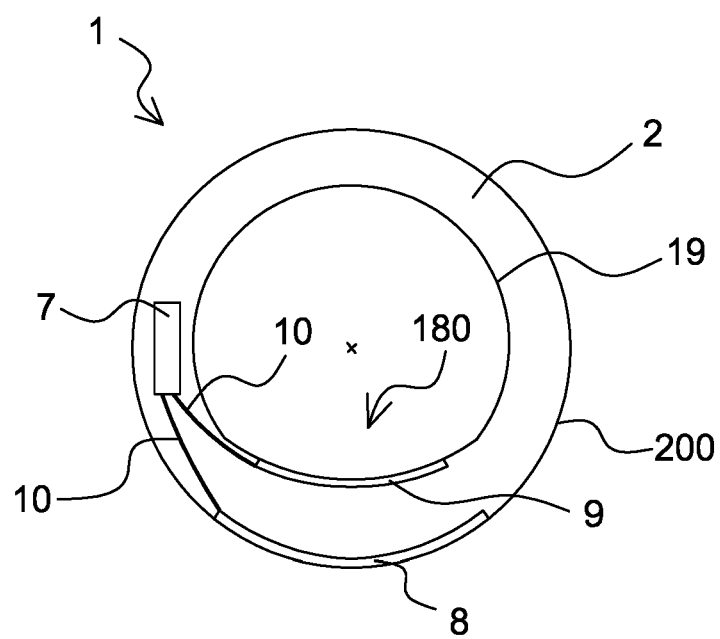
FIG. 6 represents an embodiment of the identification device according to the invention having a shape for indexing the rotation of the ring relative to the user's finger.

In the embodiment in FIG. 6, the ring 2 comprises an anti-rotation means 180 for locking the rotation of the ring 2 around a finger of the user. This makes it possible to index the rotation of the ring 3 around the finger to ensure the positioning of the antenna 8 inside of the hand when the latter is closed. This anti-rotation means 180 has in this case an ovoid shape in the inner face 19 of the ring 2 and the side of the antenna 8. The center of the oval shape coincides for example with the center of the ring 2.

As shown in FIGS. 7A to 7C, the ratio R' between the largest thickness E1 of a ring portion having the ovoid shape and the basis thickness E2 of the ring 2, i.e. the thickness of a ring portion without the ovoid shape, is variable and comprised for example between 1 and 5, preferably between 1 and 3. The ratio R' can thus be for example 1, 4 (see FIG. 7A), 2.2 (see FIG. 7B), or 2.6 (see FIG. 7C).

Alternatively, the ovoid shape can be replaced with a flat shape in the inner face 19 and in the outer face 200 (see FIG. 7D), or only in the inner face 19 (see FIG. 7E). The ratio R' can also be variable and equal for example to 1 (FIG. 7D), or 3 (FIG. 7E). Alternatively, a flat or ovoid shape is provided along two diametrically opposite sides of the ring 2. The specific shape of the ring 2 for correctly indexing the antenna 8 could be protected independently of the previously-described data erasure system.

Figure 11:
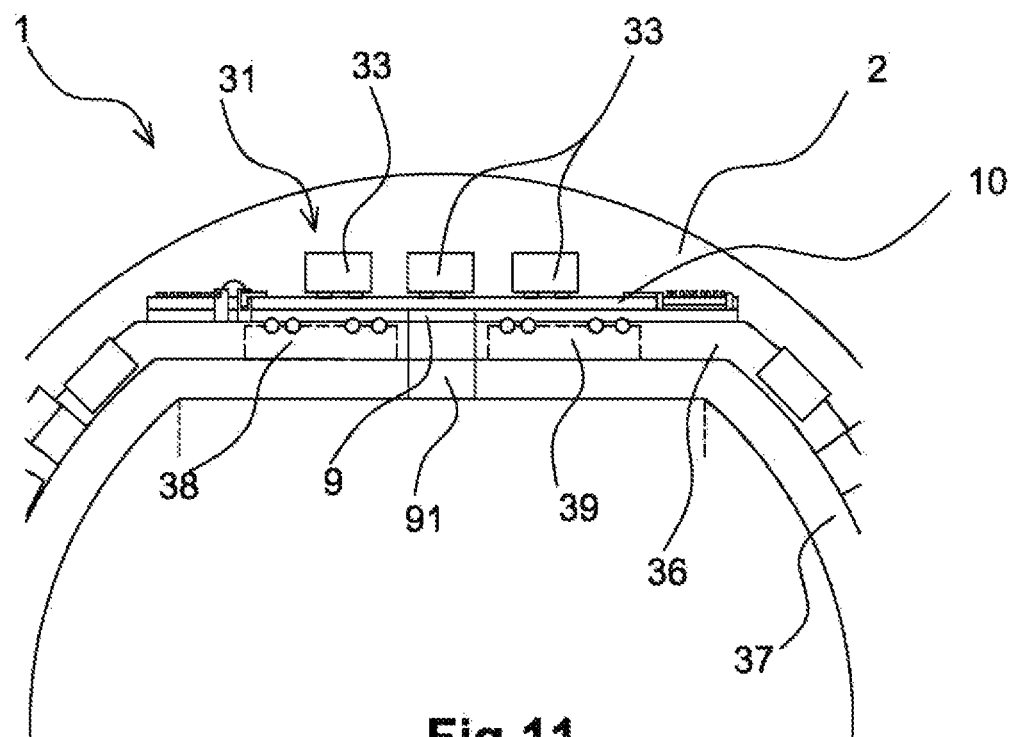
FIG. 11 is a partial sectional view of the identification device according to the present invention.

In the embodiment in FIG. 11, a PCB 10 on which are fixed the components is arranged on the flat part of the ring 2. The PCB 10 is covered by two peripheral protective layers 36, 37.

The energy storage system 31 has capacities 33 in the form of capacitors fixed to the PCB 10. The photosensitive cell 9 which performs detection when the ring 2 is removed from the finger is covered by the varnish layer 91.

The elements 38, 39 located on either side of the cell 9 are NFC controllers, as well as the secure module for working in the payment sector, allowing in particular banking transactions via the device 1 according to the invention.

In the case of an automobile application illustrated in FIG. 8, the transponder 3 can for example communicate with N directional radio readers 15 (N being an integer superior or equal to 1) in a vehicle 20. This communication enables a carrier of the identification device 1 to access rights and/or services.

For this purpose, each radio frequency reader 15 comprises a receiving antenna for the transponder 3. This antenna is preferably in the form of a coil of rectangular section associated with a capacitor to form a resonant antenna. Such an antenna concentrates its energy in certain directions and is designed to operate optimally at a certain resonant frequency and for a precise adaptation resistance. To make this antenna less sensitive to the surrounding metallic elements, its resonance frequency and its adaptation resistance have been adapted.

In an exemplary embodiment, a coil of about 3 mH having a matching resistance of about 250 to 500 ohms provides the radio reader 15 with an optimal quality signal. The resonance frequency is not necessarily set at the frequency of the electromagnetic field emitted by the transponder 3. Indeed, a better reception of the electromagnetic field is obtained when the resonance frequency of the antenna of the radio reader 15 is superior to 5 to 20% of the frequency of the electromagnetic field. The power supply for the radio reader 15 is provided by a battery 21 in the vehicle 20 and generally delivers a voltage of 12 volts.

This type of radio reader 15 is placed so as to optimize the reading of the electromagnetic field emitted by the transponder 3. As an example, visible in FIGS. 9A to 9D, four radio readers 15 (N=4), each controlling a different function, are installed on a vehicle 20. The radio readers 15 were in this case integrated in a door handle 151, in a trunk handle 152, in a gearshift knob 153, and near a safety belt buckle 154. For a motorcycle, the radio readers 15 can be integrated onto the fuel tank or into the acceleration handle. Note in this case that the electromagnetic field is slightly attenuated by a glove-type textile interposed between the transponder 3 and the radio reader 15. The radio readers 15 are in the form of a solenoid comprising about 400 turns having an inductance of about 3 mH. The form, their adaptation resistance, their resonance frequency, and the number N of radio readers 15, are not limited.

Thus, when the wearer grasps the handle of a vehicle door 20 to open it with his hand carrying the identification device 1 in an activated state, the device 1 undergoes an electromagnetic induction from the radio reader 151 integrated in the handle. The induced current, of about 10 A and 5V, is sufficient to power the transponder 3 which sends back to the antenna of the radio reader 151 a high security identification code preprogrammed during the manufacture thereof or a copy made by the communicating device. This identification code is then filtered, demodulated and analyzed by a microcontroller in an electronic circuit near the radio reader 153. The identification device 1 is then recognized, the vehicle 20 is instantly unlocked and an adaptation of the driving position is quickly carried out within a time of about 4 to 6 seconds.

In order to better control the communication between the identification device 1 and the radio readers 15, a switch 17 controls the powering up of the electronic circuit in the vehicle under the control of the housing 18, thereby enabling a radio reader 153 to emit a strong magnetic field.

Preferably, an ignition switch 17 controlling the preheating, starting and stopping of the engine in the vehicle 20, is associated with an starting radio reader 153 in the gearshift knob. The switch 17 may be placed in the cockpit, at hand of the driver such as on the side of gearshift knob, close to the hand brake, or on the dashboard. Such a switch 17 can be parallel to the conventional starting system by connecting preheating and starting control wires to relevant actuators of the engine or by connecting them to a key switch 23.

Thus, when the driver in the driving position presses the switch 17 controlling the ignition and when she places her hand with the device identification 1 close to the starting radio reader 153, the vehicle 20 starts. The vehicle 20 remains in operating condition until a further press on the switch 17. For this purpose, the starting radio reader 153 detects the identification device 1 and when the user presses the switch 17, the associated reader 153 switches to an unpowered state. In this state, the reader 153 no longer needs identification to keep the engine running. When pressing the switch 17 again, the engine in the vehicle 20 the radio reader 153 will be stopped simultaneously. The radio reader 153 will then request the high security identification code from the identification device 1.

The N readers generally move from one powered state to another depending on the state of locking or unlocking of the vehicle 20, with the exception of the starting radio reader 153 and the reader 152 in the trunk handle. Indeed, whatever the locking or unlocking of the vehicle 20, the reader 152 can actuate cylinders for opening the trunk automatically. Of course, each radio reader 15 can also be associated with a switch 17.

Figure 5:
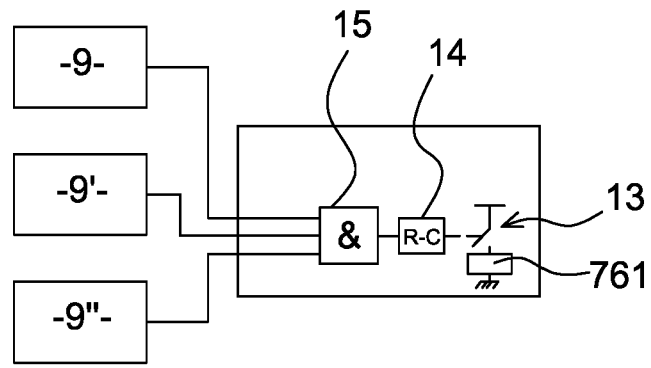
FIG. 5 is a block diagram of the logic associated with the command interpreter when using several photovoltaic cells.

As shown in FIG. 5, the identification device 1 can operate a central locking and unlocking control 22 on a key switch 23, on various accessories 24, on a driver's seat 25, on rear-view mirrors 26, and on an interface 27 controlling an on-board computer 28, a GPS 29, and a vehicle configuration. These various commands operate via actuators controlling for example the position and orientation of the mirrors 26, the position, the height, the inclination of the driver's seat 25 and its headrest, the position of the steering wheel. Via a bus connected to a interface 27 adapted to the vehicle communication protocol 20, the device 1 can also control the display of a computer screen 28, the radio station heard, the voice of the GPS 29, the height of the suspensions and their hardness, the power steering hardness, the driver assistance electronics, the driving profile, the vehicle power, and a possible restraining of the engine for young drivers. Preferably, the identification device 1 is synchronized with the absolute time clock sent by the GPS.

Thus, when a wearer is authenticated as a driver of a vehicle 20, she finds again each of the settings, accessories 24, and driving profile, as she had programmed. Each additional setting that the driver will make during her session will be recorded. The invention thus enables to find the driving position exactly as left during the last use, and to restrain the engine for young drivers.

Depending on the vehicle 20 and the need, the identification device 1 can also be connected to the Internet via a cellular data connection, by Wi-Fi or Bluetooth, thereby enabling interaction with the database. of the vehicle 20 containing a certain number of its characteristics, for example and without limitation: the identification profiles, the configuration of the driving position, the driving history, the driving scheduling, the consumption of fuel, the mileage carried out or to carried out, the route programmed in GPS the 29, and the route really taken.

In addition, several identification devices 1 can be synchronized to the same vehicle 20. The registration of the identification devices 1, the driving position, and the engine configuration is carried out by actuating a specific command of the electronic circuit 18 interacting with the microcontroller. Thus, each wearer using the vehicle 20 can be identified. The entire driving position, as well as the characteristics of the engine can be adapted, hours of use, as well as history can be recorded. The specific control of the electronic circuit 18 can be in the form of a switch, a code keypad, or an Internet-type remote access.

The use of such an identification device 1 thus enables a simplified and secure identification. In addition, this device 1, which does not require a battery, does not risk oxidization. More advantageously, the device 1 enables the wearer to operate her/his identification device 1, when s/he wants to, there avoiding any inadvertent operation without control of the wearer.

The radio frequency transponder 3 can comprise, in a variant, several microcontrollers 7 and several antennas 8. Furthermore, the exemplary embodiment has been given with reference to a user's personal data, but the invention can of course be implemented with any type of data stored in the memory 76 in the microcontroller.

The invention claimed is:

1. An identification device, comprising:
    a ring integrating at least one radio-frequency transponder, said at least one radio-frequency transponder comprising a microcontroller provided with at least one memory comprising areas configured to store data, the data comprising personal data and identification data and at least one antenna configured to emit an electromagnetic field carrying the identification data;
    at least one photosensitive element positioned on an inner face of the ring, said at least one photosensitive element being configured to generate or to authorize a transmission of a current in response to an illumination of said at least one photosensitive element to cause a deterioration of the data stored in said at least one memory; and
    wherein said at least one photosensitive element provides a triggering function to enable an energy storage system to power the microcontroller to deteriorate the data stored in said at least one memory.

2. The identification device according to claim 1, further comprising at least one energy recovery system configured to supply energy to the energy storage system.

3. The identification device according to claim 1, wherein said at least one photosensitive element is formed by a photovoltaic cell.

4. The identification device according to claim 1, wherein said at least one photosensitive element is covered with a layer of translucent protective varnish.

5. The identification device according to claim 1, further comprising a plurality of photovoltaic cells.

6. The identification device according to claim 5, wherein said plurality of photovoltaic cells are angularly spaced from each other in a regular manner around the ring.

7. The identification device according to claim 1, wherein said at least one photosensitive element is associated with an electronic circuit having at least one resistor configured to set a triggering threshold for a state change of said at least one photosensitive element and a capacitor configured to set a duration before triggering the state change.

8. The identification device according to claim 1, wherein said at least one photosensitive element is connected to an electronic switch configured to cause an erasure or encryption of the data in response to powering of the electronic switch by said at least one photosensitive element.

9. The identification device according to claim 1, wherein the ring comprises at least one anti-rotation element configured to lock a rotation of the ring around a finger of a user.

10. The identification device according to claim 9, wherein said at least one anti-rotation element constitutes a flat or ovoid shape formed in the inner face of the ring.

11. The identification device according to claim 10, wherein a ratio between a thickest portion of the ring comprising the flat or ovoid shape and a thickness of a portion of the ring without any flat or ovoid shape is between 1 and 5.

12. The identification device according to claim 1, wherein the data stored in the memory of the microcontroller are encrypted.

* * * * *